O. J. KOHN.
TRANSMISSION MECHANISM.
APPLICATION FILED APR. 26, 1918.
1,289,195.
Patented Dec. 31, 1918.
3 SHEETS—SHEET 2.
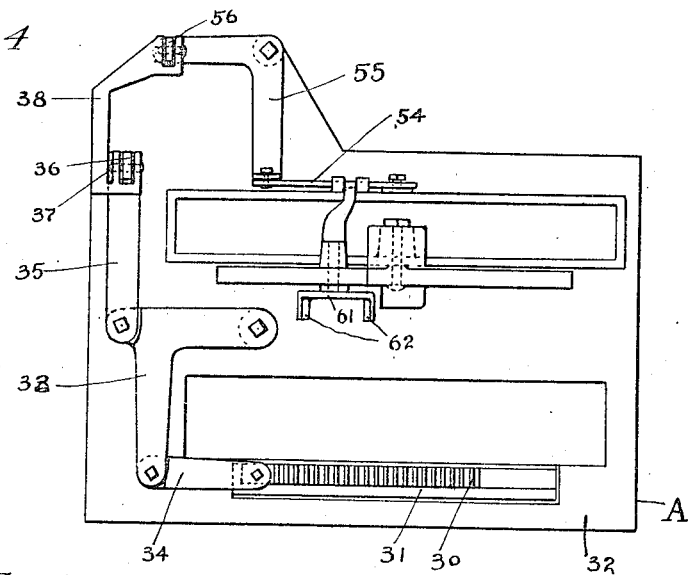
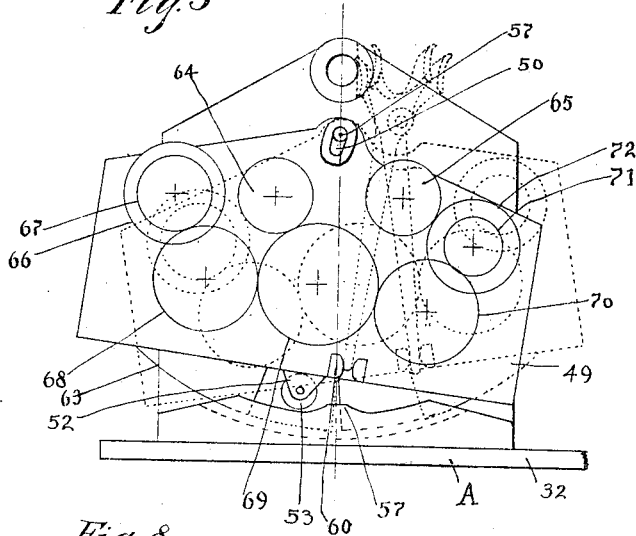
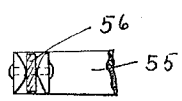
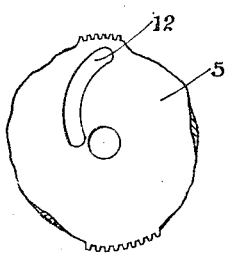
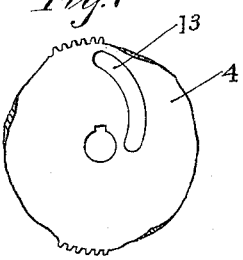
Inventor,
Otto J. Kohn
H. S. Johnson
his Attorney.

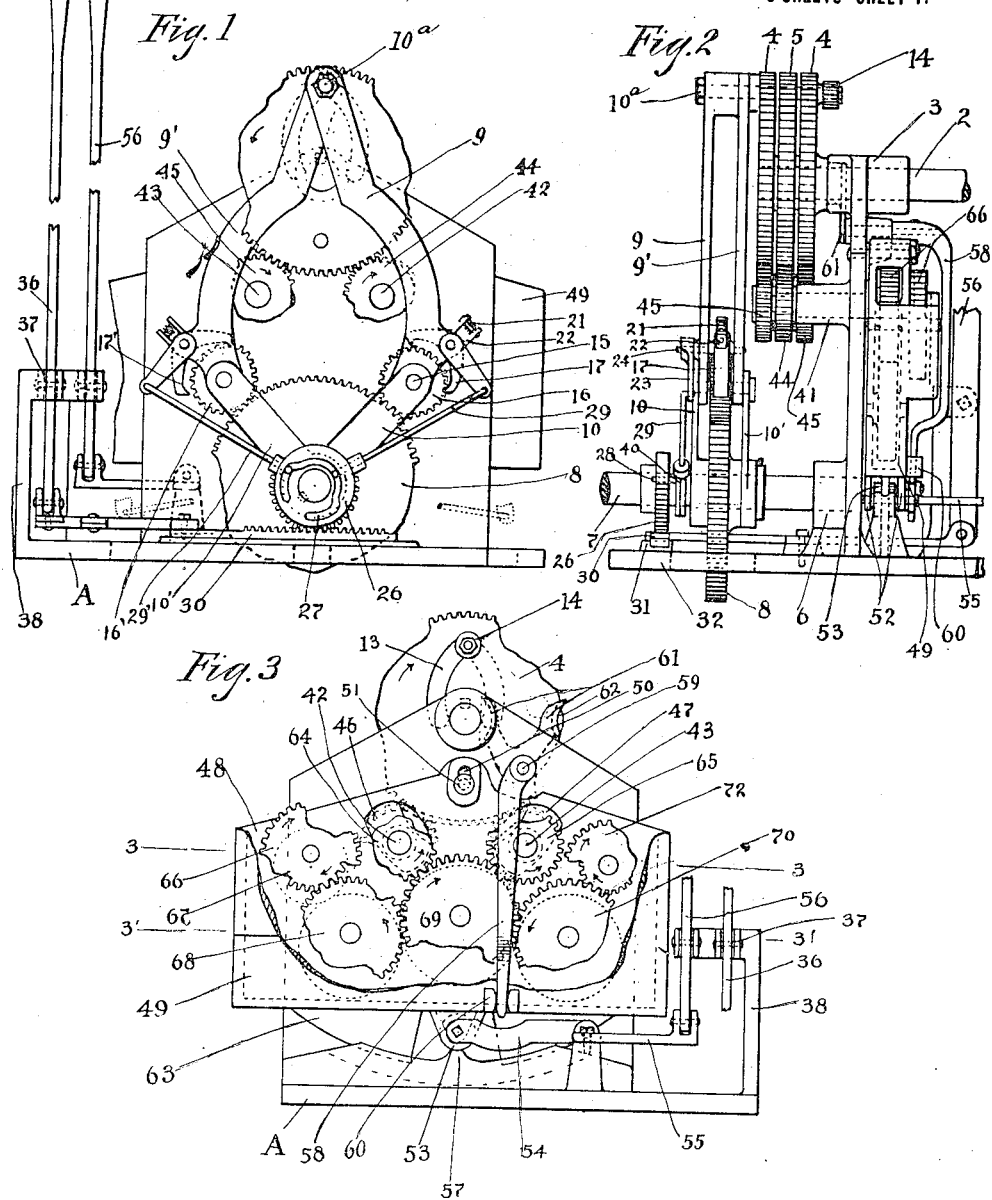

O. J. KOHN.
TRANSMISSION MECHANISM.
APPLICATION FILED APR. 26, 1918.
1,289,195.
Patented Dec. 31, 1918.
3 SHEETS—SHEET 3.
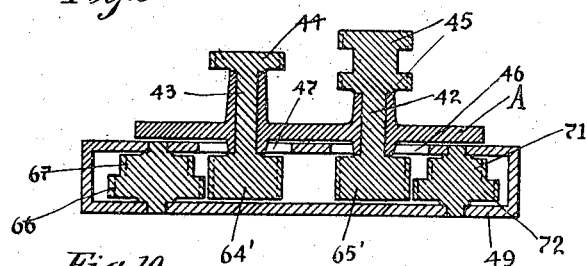
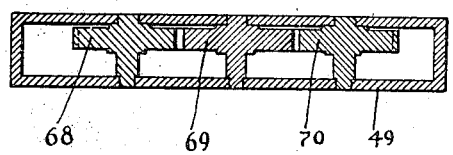
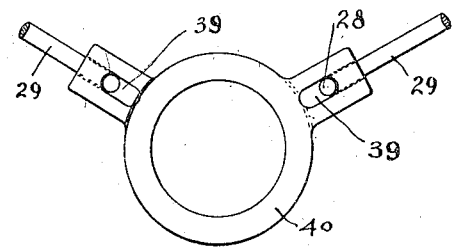
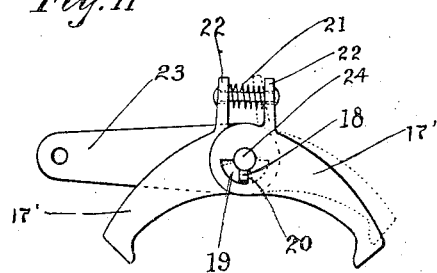
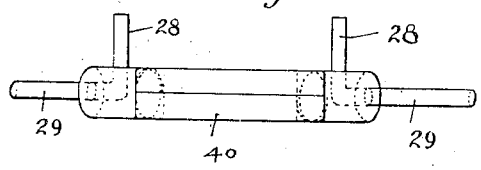
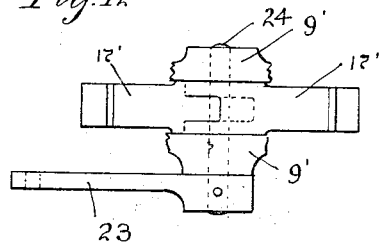
Inventor,
Otto J. Kohn
H. S. Johnson
his Attorney.

UNITED STATES PATENT OFFICE.

OTTO J. KOHN, OF TAMARACK, MINNESOTA.

TRANSMISSION MECHANISM.

1,289,195.  Specification of Letters Patent.  Patented Dec. 31, 1918.

Application filed April 26, 1918. Serial No. 230,884.

*To all whom it may concern:*

Be it known that I, OTTO J. KOHN, a citizen of the United States, residing at Tamarack, in the county of Aitkin and State of Minnesota, have invented certain new and useful Improvements in Transmission Mechanism, of which the following is a specification.

This invention relates to improvements in transmission devices, and has for its object to provide improved means for changing the speed of the driven element in automobile engines and the like.

One of the objects of the invention is to overcome the disadvantages found in the usual transmission mechanisms wherein the gears are caused to mesh by sliding them sidewise upon their shaft, the end of the teeth of the gears being formed with a knife edge for that purpose.

The invention consists in the construction, combination and arrangement of parts hereinafter described and claimed.

Figure 1 is a vertical front view of the invention, and

Fig. 2 is a side view of the same,

Fig. 3 is a fragmentary rear view of Fig. 2,

Fig. 4 is a plan view of Fig. 1, some of the parts being omitted,

Fig. 5 is a diagrammatic elevation of the gear trains,

Figs. 6 and 7 are fragmentary views of the driving gears,

Fig. 8 is a detail,

Figs. 9 and 10 are sectional plan views on lines 3 and 3' of Fig. 3,

Fig. 11 is a front view of the reversing pawl mechanism,

Fig. 12 is a plan view of the same,

Fig. 13 is a front view of a detail, and

Fig. 14 is a plan view of the same.

Referring to the drawings (Fig. 1) A represents the frame or housing in which is mounted a driving or main shaft 2 connected with the engine and journaled in the hub 3 on the uppermost portion of the frame A and having rigidly mounted on its outer end a pair of spaced spur driving gears 4 and a similar gear 5 rotatably mounted on said shaft between the gears 4.

Rotatably mounted in the hub 6 in the lower part of the frame A and having its long axis parallel with that of the driving shaft 2 is the driven shaft 7. Rigidly mounted on the shaft 7 is the spur gear 8 which is operatively connected with the driving gears 4 through the medium of a pair of reciprocatory jointed connecting arms 9 and 9' pivotally joined with the links 10 and 10' at their outer ends, said links being rotatably mounted at their other ends on the driven shaft 7.

The connecting rods 9 and 9' are journaled at their upper ends on a crank pin 10ª which passes slidingly through the slots 12 and 13 of the gears 4 and 5 respectively, the crank pin 10ª carrying rotatably on its inner end the anti-friction roller 14.

The driving gears with the crank pin constitute a crank and move as a unit. The crank pin 10ª is rigidly secured in the connecting arm 9 and passes loosely through the rod 9' so that when the driving gears 4 are rotated through the medium of the shaft 2 the crank pin passing through the point of intersection (Figs. 6 and 7) of the slots 12 and 13, said slots being outwardly curved and located on the wheels 4 and 5, so that they will be directed to opposite sides of the drive shaft 2, the outermost ends of the slot being adjacent to the outer face of the gear, the slots intersecting each other when they are caused to overlap. Thus the slots when the gears 4 and the gear 5 are caused to rotate at different speeds will carry the crank pin 10ª downwardly toward the shaft 2, thereby changing the stroke of the connecting rods 9 and 9' for reasons hereinafter to be explained.

Rigidly mounted on the pivot pins 15 connecting the arms 9 and 9' and the links 10 and 10' are the gears 16 and 16' adapted to engage the double pawls 17 and 17' which are pivotally mounted on the connecting rods 9 and 9' at a point above and outside the pivots 15. The pivot pin 24 of the pawls 17 and 17' has a downwardly projecting lug 18 which works in an opening 19 in each of the pawls whereby the rotary motion of the pawls is restricted.

As shown in Fig. 11 the pawls are shown in their normal position, the radial edges 20 of the openings 19 in the pawls 17 and 17', being shown abutting against the lug 18. This is also the position of the pawl 17' indicated in dotted lines.

The spring 21 between the lugs 22 tends constantly to keep the shoulders 20 of the pawls pressed against the lug 18. The lever arm 23 is rigidly connected with the pivot pin 24 of the pawls, so that when the lever 23 is actuated the two pawls on the spindle will move as a unit, each pawl being movable individually however with reference to the lever 23 to the position shown in dotted lines, so that either pawl may ride over the teeth of the gear 16.

Rotatably mounted on the shaft 7 is the mutilated gear 26 having a cam slot 27 slidably receiving the pin 28. The longitudinal axis of the pin 28 is parallel to that of the shaft 7 and is integral with the rod 29 which is pivotally connected with the lever arm 23 at its outer end. The cam slot 27 differentiates so that when the gear 26 is rotated it will alternately actuate the rods 29 and 29' to slightly reciprocate the spindle 24, thereby causing one or other of the pawls 17 and 17' to alternately engage the gear 16.

Thus, as shown in Fig. 1 wherein the connecting rod is shown traveling downwardly the upper of the two pawls 17' is shown in engagement with the gear 16', while on the opposite side of the housing the connecting rod 9 which in the position shown is moving in an upwardly direction, the lower of the pawls 17 is riding over the teeth of the gear 16.

It will be noted that a continuous rotation of the driven gears 4 in the direction of the arrow (Fig. 1) would cause the gear 16' to reciprocate on the periphery of the gear 8 driving it forward with each downward stroke, the upper of the pawls 17' riding over the teeth of the gear 16' on its upward stroke, while the gear 16 reverses the action of the gear 16' in that it drives the gear 8 on its upward stroke, the lower of the pawls 17 checking the gear 16 against turning.

Thus it will be noted that the gear 8 will be continuously driven by the reciprocatory movements of the connecting rods 9 and 9', the gear 8 moving in a direction indicated by the arrow.

For the purpose of reversing the direction of rotation of the gear 8, I provide a sliding rack 30 which meshes with the gear 26 and is slidably mounted in a horizontal groove bed 31 on the base plate 32 of the housing. On the base plate 32 of the housing arranged to reciprocate in a horizontal plane and pivotally mounted on the plate 32 is a T lever 33 having a link connection 34 with the rack, and link connection 35 with the hand lever 36, said hand lever having fulcrum 37 on a standard 38 of the frame. Thus the rack 30 may be reciprocated horizontally to actuate the gear 26 and thereby reverse the positions indicated in Fig. 1 of the pawls 17 and 17' which in turn will reverse the direction of rotation in the gear 8.

The rods 29 operate in the groove 39 on the rings 40 which are rotatably mounted on the shaft 7. Journaled in the hubs 41 in the housing and parallel to the shafts 2 and 7 and between them are the shafts 42 and 43 having rigidly mounted on their outer ends the gear 44 and 45. The gear 44 meshes with the driving gear 5 and the gear 45 which is double, meshes with the driving gears 4.

The shafts 42 and 43 pass through the openings 46 and 47 in the rear wall 48 of a swinging gear box 49, said gear box having pivotal and slidable mounting in the slot 50 on the uppermost portion of the rear wall 48 of the gear box 49.

A suitable cap screw 51 holds said gear box in position. Integral with the bottom of the gear box is a pair of lugs 52 supporting rotatably between them a roller 53, a link 54 pivotally connected with said lugs extending laterally therefrom and having pivotal connection at its other end with a bell crank 55, said bell crank having pivotal connection with the lower end of the lever 56 fulcrumed on the standard 38.

Thus when the lever 56 is actuated, the roller 53 will be moved sidewise off the pedestal 57 whereafter the gear box 49 will by gravity move downwardly in the slot 50 until it is supported on the pin 51. A tripping lever 58 having pivot shaft 59 in the frame A extends downwardly along the gear box 49, its lower end passing between a pair of lugs 60 on the gear box.

Rigidly mounted on the outer end of the pivot shaft between the inner gear 4 and the housing is an upwardly projecting crank arm 61 having a pair of pallets 62 which are engageable by the roller 14 when the driving gears 4 are rotated, so that when the roller 14 has been moved to its extreme outer or inner position through the medium of the crank pin 10$^a$ in the slot 12 and 13, it will engage said pallets and thereby actuate the lever 58 and cause the gear box 49 to be moved into the position shown in Fig. 3. The gear box 49 is further guided along its lower edge by a pair of flanges 63 which fit slidingly in a segmental groove.

The shafts 42 and 43 pass through the openings 46 and 47 in the gear box 49 and have mounted on their inner ends the gears 64 and 65 respectively, said gears being of uniform size. Rotatably mounted in the gear box 49 is a gear train, one of the gears being adapted to mesh with either of the gears 64 or 65 when the gear box 49 is actuated. The gear train comprises the gear 66 integral with the gear 67 which latter meshes with the gear 68, said gear 68 meshing with the gear 69, which in turn meshes with the gear 70. Meshing with the gear 70 is the gear 71 integral with the gear 72.

As shown in Fig. 3 of the drawings the gear 69 is shown meshing with the gears 64 and 65, the right and left flanks of the gear train becoming idlers. When in this position the driving gears 4 and 5 are held in permanent relation. If however, the gear box 49 is swung to the position shown in Fig. 5, the gear 69 is caused to mesh with the gear 64 and the gear 72 will mesh with the gear 65, the gears 66 and 68 becoming idlers. When in this position the gear 71 being the smallest gear in the train, will cause the gear 65 to rotate more rapidly than the gear 64 and in turn will cause the gear 45 meshing with the driving gears 4 to rotate more rapidly than the driving gear 5, thereby causing the crank pin $10^a$ to slide in the intersection space of the slots 13 and 14 toward the center of the shaft 2.

The crank pin will continue to travel centerward until the gear box is caused to be moved, thereby throwing the train out of gear. When the gear box 49 is moved in the position opposite that shown in Fig. 5, the gear 69 will mesh with the gear 65 and the gears 70 and 71 and 72 will become idlers, while the gears 67, 66 and 68 become active, gear 66 then meshing with the gear 64, while the gear 67 which is slightly larger than the gear 65 will cause the gear 64 to rotate more rapidly than the gear 65, thereby causing the driving gear 5 to revolve more rapidly than the driving gears 4, which in turn will cause the crank pin $10^a$ to travel in the slots 12 and 13 away from the shaft 2 in an outward direction, thereby changing the speed at which the driven shaft 7 will rotate.

Referring to Fig. 3 of the drawing, the dotted lines representing the gears, indicate the position of the gears when the gear box 49 has been moved slightly either to the right or left sufficiently to suspend the box on the stud 57.

When in this position the gears 64 and 65 no longer engage the gears 69, all the gears in the gear box thereafter becoming idlers.

In Fig. 8 is shown the connection between the lever 56 and the bell crank 55.

I claim:

1. In a device of the class described, in combination with the frame, a driving shaft and a driven shaft, of a plurality of driving gears having outwardly curved inwardly slanted slots in their webs and mounted on the said driving shaft, one of said gears being rotatable thereon and having its slot curved and slanted oppositely to those in the other driving gears and arranged to intersect them, a crank pin slidable in the slots, a gear on the driven shaft, jointed connecting arms operatively connected with said crank pin and said gear, a pair of intermediate gears in the frame operatively connected with said driving gears, a shiftable gear train comprising varying gears selectively engageable with said intermediate gears, and means for shifting said gear train to selectively mesh with either of the intermediate gears for the purpose specified.

2. In a device of the class described, in combination with the frame, a driving element and a driven element including a gear, of a crank having a crank pin on the driving element, jointed connecting arms between said crank pin and said driven element, gripping gears rotatably mounted at the joints of said connecting arms and meshing with said gear, and hand operable pawl mechanism on the frame and operatively connected with said gripping gears to control them, for the purpose specified.

3. In a device of the class described, the combination with the frame, a driving shaft and a driven shaft including a gear, of the plurality of gears mounted on said driving shaft one of the gears being rotatable thereon, reciprocatory mechanism operatively connected with said gears and said driven shaft and the gear thereon, a pair of intermediate gears operatively connected with said gears on the driving shaft and a hand operable shiftable gear train to selectively engage said intermediate gears for the purpose specified.

In testimony whereof I affix my signature in presence of two witnesses.

OTTO J. KOHN.

Witnesses:
CLARENCE BEGGS,
D. D. MARTIN.

Copies of this patent may be obtained for five cents each, by addressing the "Commissioner of Patents, Washington, D. C."